C. J. DUQUETTE.
GUARD FOR THE HANDLES OF COFFEE PERCOLATORS AND THE LIKE.
APPLICATION FILED DEC. 5, 1921.

1,405,983.

Patented Feb. 7, 1922.

Inventor
Charles J. Duquette,
Thomas R. Harney
Attorney

UNITED STATES PATENT OFFICE.

CHARLES JOSEPH DUQUETTE, OF SCHENECTADY, NEW YORK.

GUARD FOR THE HANDLES OF COFFEE PERCOLATORS AND THE LIKE.

1,405,983.

Specification of Letters Patent. Patented Feb. 7, 1922.

Application filed December 5, 1921. Serial No. 520,182.

*To all whom it may concern:*

Be it known that I, CHARLES J. DUQUETTE, a citizen of the United States of America, residing at Schenectady, in the county of Schenectady and State of New York, have invented certain new and useful Improvements in Guards for the Handles of Coffee Percolators and the like, of which the following is a specification.

My present invention relates generally to handle protectors, or guards for the handles of utensils or vessels, for instance coffee percolators, which are placed over gas and oil burners and are commonly provided with wooden handles, the lower ends of which quickly burn or char under the intense heat to an extent requiring their frequent replacement and the object of my invention is to provide a simple guard which will effectively protect the lower end of the handle throughout the lifetime of use of the utensil, and a further object is the provision of a protector or guard of this nature which may be easily and quickly applied in use and which will be held against shifting movement in its effective position without requiring excess strain upon the fastening means of the handle.

Figure 1:
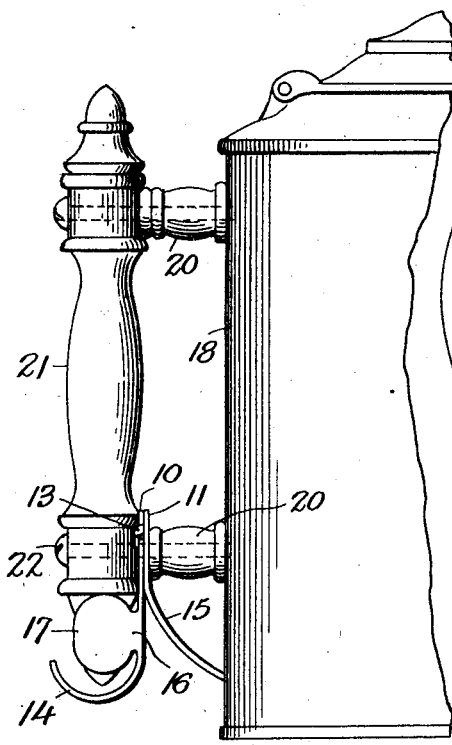
Figure 2:
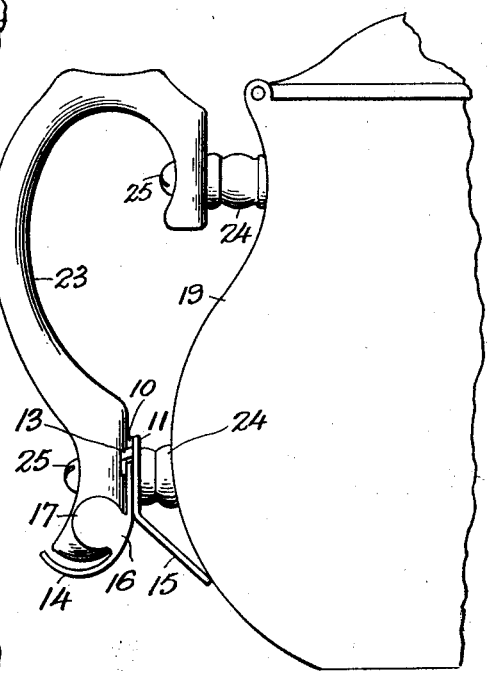
Figure 3:
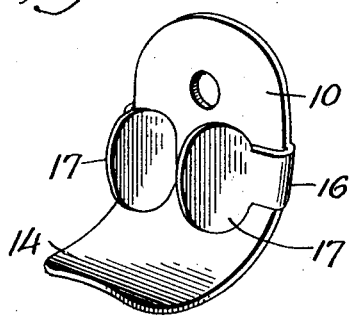
Figure 4:
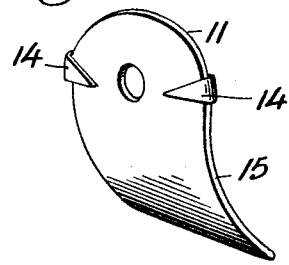

In the accompanying drawing which illustrates my present invention and forms a part of this specification, Figure 1 is a partial side view illustrating the practical application of my invention to a utensil having a wooden handle and wooden spacing members between the same and its handle, Figure 2 is a similar view illustrating the application of the invention to a slightly different type of utensil employing metal spacers between the same and its handle, Figure 3 is a detail perspective view of one part of the protector or guard, and Figure 4 is a similar view of the other part of the protector or guard.

Referring now to these figures and particularly to Figures 3 and 4 my invention proposes a protector or guard for the wooden handles of a certain class of utensils as for instance coffee percolators and the like, which consists of two flat sections of material 10 and 11 adjacent to the upper portion of each of which is an aperture 12. In use the upper portions of these two flat sections of material are disposed in face contact with their apertures 12 in registry, plate 11 having adjacent to its upper ends inwardly projecting integral spurs 13 spaced therefrom to receive the upper portion of the plate 10 beneath the spurs so as to thus hold the two plates, or rather their upper portions, against lateral displacement with respect to one another.

The plate 11 having the spurs 13, has its lower portion deflected at an angle away from the plate 10, the lower portion of the latter of which is curved away from the plate 11, the two plates thus having oppositely deflected lower wings 14 and 15.

Above its lower curved wing 14 the plate 10 has inwardly bent integral side extensions 16 terminating at their inner ends in angularly outstanding ears 17 in spaced parallel relation for a purpose which will be apparent upon inspection of Figures 1 and 2.

In Figures 1 and 2 I have shown utensils in the nature of coffee percolators 18 and 19, the percolator 18 of Figure 1 having wooden spacing blocks or members 20 between the same and its handle 21. In applying my invention to this type of utensil, the lower connecting screw 22 is withdrawn and the upper portions of the two plates 10 and 11 in connected relation are inserted between the handle 21 and the lower spacing block 20, connecting screw 22 being then replaced and extending through the openings 12 of the two plates from which it is obvious the lower wing 15 of plate 11 will incline toward and in engagement with the wall of the utensil 18 below the spacing block 20 while the lower curved wing 14 of the plate 10 will extend beneath the lower end of handle 21 and the ears 17 will receive the lower end of the handle 21 between them and thus avoid all danger of rotation of the protector on the connecting screw 22 and its displacement from the effective position below the handle 21 and the spacing block 20.

The same method of installation is carried out in connection with the untensil of Figure 2 whose handle 23 has metal spacing members 24, between the lower of which members and the lower portion of the handle the device is inserted by removal and replacement of the connecting screw 25.

It is obvious that as the lower end of the wing 15 alone comes into close proximity to the wall of the utensil, my improved protector will remain comparatively cool at all times except when the utensil is actually placed on a stove or burner for heating purposes and that when in this latter position the guard will effectively protect the lower end of the handle as well as the lower spacing block which is essential where a wooden spacing block is used. It is also obvious that by virtue of the engagement of the side ears of the guard with the opposite sides of the lower portion of the handle, the guard will be effectively prevented from accidental displacement laterally of the handle without requiring unnecessary strain on the lower clamping screw to hold the guard in place.

I claim:

1. In connection with a utensil having a handle and spacing blocks between the same and the handle, a guard disposed between the handle and the lower spacing block, having lower oppositely deflected portions one of which extends toward the utensil beneath the spacing block and the other of which projects beneath the lower end of the handle.

2. In connection with a utensil having a handle and spacing blocks between the same and the handle, a guard disposed between the handle and the lower spacing block, having lower oppositely deflected portions one of which extends toward the utensil beneath the spacing block and the other of which projects beneath the lower end of the handle, said guard having a screw receiving aperture and outstanding laterally spaced ears at opposite sides of the lower portion of the handle to prevent displacement of the guard.

3. In connection with a utensil having a handle and spacing blocks between the same and the handle, a guard disposed between the handle and the lower spacing block, having lower oppositely deflected portions one of which extends toward the utensil beneath the spacing block and the other of which projects beneath the lower end of the handle, said guard including two plates having relatively engaging portions to prevent displacement one from the other, one of said plates having outstanding ears at opposite sides of the lower portion of the handle for the purpose described.

4. A guard of the character described consisting of a pair of plates having lower oppositely deflected portions and having their upper portions in face to face contact and provided with registering apertures, one of said plates having at its upper portion integral side pieces embracing the side edges of the other plate to prevent relative displacement of the plates in a lateral direction, and the other of said plates having inturned integral side extensions terminating in outstanding laterally spaced ears for the purpose described.

In testimony whereof I have affixed my signature.

CHARLES JOSEPH DUQUETTE.